United States Patent Office 3,629,270
Patented Dec. 21, 1971

3,629,270
CERTAIN 2,6-DICHLORO-3,5-PYRIDINEDI-CARBONITRILES
Joachim Gante and Sigmund Lust, Darmstadt, Germany, assignors to Merck Patent Gesellschaft mit beschrankter Haftung, Darmstadt, Germany
No Drawing. Filed Feb. 20, 1970, Ser. No. 13,190
Claims priority, application Germany, Feb. 22, 1969, P 19 08 947.5
Int. Cl. C07d *31/46*
U.S. Cl. 260—294.8 F         12 Claims

ABSTRACT OF THE DISCLOSURE

Compounds of the formula

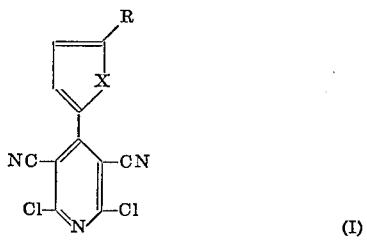

(I)

wherein X is O, S or NH and R is H, halogen, $NO_2$, $SO_3H$, the acyl group of a carboxylic acid containing up to eight carbon atoms or $NR_1R_2$ in which $R_1$ and $R_2$ are H, alkyl containing 1–8 carbon atoms or acyl as defined herein, possess anti-fungal activity and are pest control agents generally.

BACKGROUND OF THE INVENTION

This invention relates to novel substituted pyridines, more particularly, 4-substituted-2,6-dichloro-pyridine-3,5-dicarbonitriles, to their use as pesticides and to processes for the production thereof.

SUMMARY OF THE INVENTION

Compounds of the formula

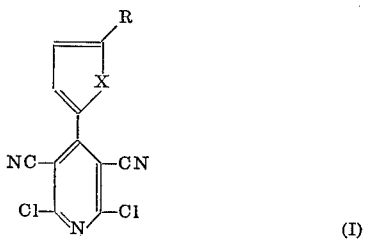

(I)

wherein X is O, S or NH, and R is H, halogen, $NO_2$, $SO_3H$, $NR_1R_2$ or the acyl group of a carboxylic acid containing up to 8 carbon atoms, wherein $R_1$ and $R_2$ can be identical or different and represent H, alkyl of 1–8 carbon atoms or the acyl group of a carboxylic acid containing up to 8 carbon atoms, are valuable pesticides and pest control agents. In particular, they exhibit good fungicidal activity.

OBJECTS OF THE INVENTION

It is an object of this invention to provide novel compounds of Formula I. It is another object to provide a method for the use of compounds of Formula I as pest control agents, and especially as fungicides. It is a further object to provide processes for the preparation of compounds of Formula I. Other objects will be apparent to those skilled in the art to which this invention pertains.

DETAILED DISCUSSION OF THE INVENTION

The five-membered heterocyclic group at the 4-position of the pyridine ring of the compounds of Formula I can be a furyl-(2), a pyrrolyl-(2) or a thienyl-(2) group, each of which can optionally be substituted at the 5-position thereof. Preferred are compounds of Formula I wherein the five-membered heterocyclic group is a furyl group, i.e., X is O.

When the five-membered heterocyclic residue is substituted at the 5-position, suitable substituents are those wherein R is halogen, preferably chlorine, bromine, or iodine, but also fluorine, nitro, sulfo, acyl, amino, monoalkylamino, dialkylamino, and acylamino. The acyl group at the 5-position, and the alkyl and acyl groups on the nitrogen of the amino group can be saturated or unsaturated and can contain up to 8 carbon atoms. Examples of saturated alkyl groups are methyl, ethyl, n-propyl, isopropyl, n-, sec.-, and tert.-butyl, isobutyl, amyl, isoamyl, and isomers and the higher homologs thereof containing up to 8 carbon atoms. Examples of unsaturated alkyl groups are allyl, 1- and 2-butenyl, and butadienyl.

Examples of acyl groups contained in the compounds of this invention are the acyl groups of the fatty acids, e.g., acetyl, propionyl, butyryl, valeroyl, of unsaturated aliphatic acids, e.g., acrylyl, crotonyl, of aryl acids, e.g., benzoyl, and of alkaryl, aralkyl, cycloalkyl and cycloalkylalkyl acids, etc. Such groups can bear one or more simple substituents, e.g., halogen, alkyl, nitro, sulfo, (sulfonyl), alkyl, amino, alkylamino or acylamino as defined herein but preferably are unsubstituted.

The compounds of this invention can be produced, for example, by treating a pyridone derivative of the formula:

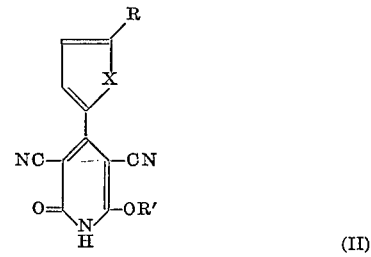

(II)

wherein X and R have the values given above and R' is hydrogen or an equivalent of an alkali metal, alkaline earth metal, or ammonium cation, with a chlorinating agent; or by converting a compound of Formula I into another compound of Formula I by converting a substituent R into another substituent R defined herein by conventional methods.

When R' of the compounds of Formula II is an alkali-metal cation, especially suitable cations are sodium and potassium ions. However, R' can also be a lithium cation. Preferred alkaline earth metal cations are calcium and magnesium cations. R' can, however, also be a barium ion.

A compound of Formula II is chlorinated in a conventional manner with chlorinating agents, such as, for example, $PCl_5$, $PCl_3$, $POCl_3$ or $SOCl_2$, or mixtures of these substances. Suitable solvents are all organic solvents inert under these chlorination conditions, e.g., benzene, toluene, xylene, pyridine, dimethylformamide or dimethylaniline, or mixtures of these solvents. In many cases, it is advantageous to employ the chlorinating agent itself as the reaction solvent. Good yields are obtained, for example using $PCl_5$ in boiling $POCl_3$.

The reaction temperatures during these chlorination processes range generally between 50 and 160° C. Reaction times are usually about 30 minutes to 6 hours or longer. The work-up process is conducted in a conventional manner, for example by decomposing the reaction mixture with ice water or an alcohol, e.g., methanol or ethanol. Generally, the desired compounds of Formula I are precipitated during this step.

The pyridones of Formula II which can be employed as starting materials can be produced, for example, by reacting compounds of the formula

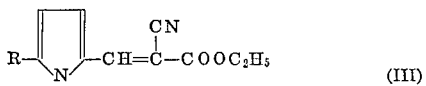

(III)

wherein X and R have the values given above, with cyanoacetamide under alkaline conditions, such as, for example, with NaOH, KOH or NH₃ in methanol or ethanol.

For converting a substituent R in a compound of Formula I into another substituent R, methods can be employed known from the chemistry of heterocycles which do not alter the remaining portion of the molecule. Thus, it is possible, for example, to halogenate the unsubstituted compounds of this invention, i.e., compounds of Formula I wherein R is hydrogen, with elemental chlorine, bromine or iodine, optionally in the presence of a solvent and/or a catalyst, or sulfonate these compounds with sulfur trioxide in pyridine or with sulfuric acid, or nitrate the compounds with nitric acid or acetyl nitrate, or acylate them with acyl halides or acid anhydrides, optionally in the presence of a Lewis acid, to produce the corresponding compounds of Formula I wherein R is halogen, sulfo, nitro or acyl, respectively. Compounds of Formula I wherein X is oxygen and R is iodine or acyl also can be obtained by reacting 2,6-dichloro-4-[furyl-(2)] - pyridine - 3,5 - dicarbonitrile with mercuric chloride, and reacting the thus-obtained 2,6-dichloro - 4 - [5 - chloromercurifuryl-(2)]-pyridine-3,5-dicarbonitrile with iodine or with an acyl halide. Compounds of Formula I wherein R is nitro can be reduced to the corresponding amino compounds in a conventional manner, e.g., with iron and hydrochloric acid, or in accordance with the equivalent methods. These amino compounds can then be alkylated or acylated in a conventional manner, if desired, to produce an alkylamino- and acylamino-substituted, respectively, compound of this invention.

The compounds of this invention are useful for combatting pests. The term "pests" as used herein means any organism or microorganism whose presence in a particular environment has an adverse effect on the ecology thereof, e.g., insects, mites, nematodes, weeds, fungi and bacteria. The can be employed particularly advantageously as fungicides, both in the open air, e.g., as a spray, as well as seed dressing agents. The compounds of Formula I can also be utilized as the effective agents in insecticidal, herbicidal, miticidal, nematocidal and microbicidal, especially bactericidal compositions, alone or optionally in combination with conventional effective agents.

The fungicidal effectiveness of the compounds of this invention was determined in the spore germination test against the known destructive fungi *Venturia inequalis*, *Alternaria spec.* and *Botrytis cinerea*. For this purpose, a series of concentrations of solutions of the effective agents in acetone were prepared. From each solution, 2 drops (1/30 cc.) were distributed in the concave ground area of an object slide (2.25 cm.²) and allowed to stand uncovered for 30 minutes so that the solvent could evaporate. Thereinafter, 2 drops of a slurry of the spores of the test fungus (containing 25,000–50,000 spores/ml.) were introduced into the cup containing the deposited compound and the thus-prepared slides were stored in moisture chambers at 21–22° C. After 24 hours, the proportion of spores which had not germinated was determined microscopically. From this value, the LD₅₀ was calculated, i.e., the amount of effective agent (measured in micrograms/100 cm.²) which inhibits by 50% the germination of the fungus spores. The comparison substances employed were the conventional fungicides N-trichloromethylthiotetrahydrophthalimide and zinc dimethyldithiocarbamate. The results are compiled in the following table.

| Fungicidal effective agent | LD$^{50}$ (in micrograms/100 cm.²) | | |
|---|---|---|---|
| | *Venturia inaequalis* | *Alternaria spec.* | *Botrytis cinerea* |
| 2,6-dichloro-4-[furyl-(2)]-pyridine-3,5-dicarbonitrile | 3 | 10 | 5 |
| N-trichloromethylthiotetrahydrophthalimide | 10 | 33 | 6 |
| Zinc dimethyldithiocarbamate | 12 | 30 | 24 |

As seen by these data, the compound of this invention inhibited spore development at a substantially lower concentration than the conventional fungicides.

The compounds of Formula I can be processed into any of the forms of application customarily employed for pest control agents. With the addition of the conventional carriers and/or fillers, it is possible, for example, to produce spraying or dusting agents as well as dressing agents for the preservation of seed, which agents can optionally contain additional additives, such as dispersing and/or wetting agents. With the use of appropriate additives, the compounds can be formed into solutions or emulsions and also in the form of aerosols which can be sprayed. The compositions suitable for application contain generally 1–95% of effective agent. In combination preparations, the proportion of the compounds of Formula I as the total proportion of effective agent is normally between 5 and 95%.

The compounds of this invention are used as pesticides and, more particularly, as fungicides by applying to the locus of infestation or potential infestation of the pest an amount of a composition as defined hereinabove comprising one or more compounds of Formula I effective to inhibit substantially the growth of the pest therein. Such locus can be the air, e.g., when the pest is an insect, the ground, e.g., when the pest is, e.g., a fungus, bacteria, nematode, etc., or plants, trees, buildings, seeds, equipment, where a pesticidal effect is desired.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION OF STARTING MATERIALS

The starting materials are available according to standard methods. The following example is a specific embodiment of such a process given for illustration purposes.

A suspension was prepared from 19.7 g. furfurylidene (2)-cyanoacetic acid ethyl ester and 8.4 g. cyanoacetamide in 150 ml. anhydrous ethanol. Within 5 minutes, a solution of 5.6 g. potassium hydroxide in 30 ml. anhydrous ethanol was added with stirring. A red solution was formed from which the reaction product consisting of potassium salt of 4 - [furyl - (2)]-6-hydroxy-2-pyridone - 3,5 - dicarbonitrile precipitated. The reaction mixture was stirred for a further three hours at room temperature. The precipitate was filtered off and dried over P₂O₅. 14.3 g. of nearly colorless crystals were obtained with a melting point >300° C.

EXAMPLES OF THE PREPARATION OF THE NOVEL COMPOUNDS

Example A

To a mixture of 240 g. of POCL₃ and 48 g. of N,N-dimethylaniline is added, under stirring and cooling with ice, 106 g. of the potassium salt of 4-[furyl-(2)]-6-hydroxy-2-pyridine-3,5-dicarbonitrile (decomposition point above 300° C.). After the first violent reaction has abated, 24 g. of finely pulverized NaCl is added. The reaction mixture is stirred for 8 hours at 90–95° C. and allowed to stand overnight. Thereafter, the excess POCl₃ is distilled off under reduced pressure at 60° C. and 160 ml. of methanol is added dropwise at this temperature. The mixture is cooled to 0–5° C. with 340 ml. of water, and the precipitate which separates is vacuum-filtered. The thus-obtained 2,6-dichloro-4-[furyl-(2)] - pyridine-3,5-dicarbonitrile is washed with methanol and water and dried; M.P. 183–185° C.

Analogously, 2,6 - dichloro-4-[pyrrolyl-(2)]-pyridine-3,5-dicarbonitrile and 2,6 - dichloro - 4-[thienyl-(2)]-pyridine-3,5-dicarbonitrile are produced by starting with the corresponding pyrrolyl and thienyl-substituted 6-hydroxy-2-pyridone-3,5-dicarbonitrile, respectively.

Example B

A solution of 24 g. of bromine in 50 ml. of glacial acetic acid is added dropwise at 80° C. over a period of 45 minutes to 30.6 g. of 2,6 - dichloro - 4-[furyl-(2)]-pyridine-3,5-dicarbonitrile in 150 ml. of glacial acetic acid. After stirring for another 1.5 hours, the reaction mixture is cooled overnight to about 0° C. The thus-crystallized 2,6 - dichloro-4-[5-bromofuryl-(2)]-pyridine-3,5-dicarbonitrile is vacuum-filtered; M.P. 205–206° C. (ethyl acetate).

Analogously, the following compounds are obtained: 2,6 - dichloro - 4 - [5-bromopyrrolyl-(2)]-pyridine-3,5-dicarbonitrile; 2,6 - dichloro - 4-[5-bromothienyl-(2)]-pyridine - 3,5 - dicarbonitrile; 2,6 - dichloro-4-[5-chlorofuryl-(2)]-pyridine - 3,5-dicarbonitrile, M.P. 178–180° C.; 2,6 - dichloro - 4-[5-chloropyrrolyl - (2)]-pyridine-3,5 - dicarbonitrile; and 2,6-dichloro-4-[5-chlorothienyl-(2)]-pyridine-3,5-dicarbonitrile.

Example C 52.8 g. of 2,6-dichloro - 4 - [furyl-(2)]-pyridine-3,5-dicarbonitrile is introduced, with stirring and cooling to 0–5° C., into 204 ml. of 89% nitric acid. The mixture is agitated for another 30 minutes and then poured into 2 liters of ice water. The thus-precipitated crystalline 2,6-dichloro-4-[5-nitrofuryl-(2)] - pyridine-3,5 - dicarbonitrile melts at 193–194° C. (ethanol).

Analogously, 2,6 - dichloro - 4-[5-nitropyrrolyl-(2)]-pyridine-3,5 - dicarbonitrile and 2,6-dichloro-4-[5-nitrothienyl-(2)]-pyridine-3,5-dicarbonitrile are prepared.

Example D

A solution of 16 g. of 2,6-dichloro-4-[5-nitrothienyl-(2)]-pyridine-3,5-dicarbonitrile in 100 ml. of acetic acid is added dropwise under agitation in the course of 30 minutes to a mixture heated to 50° C. of 20 g. of powdered iron, 40 ml. of water and 5 ml. of concentrated hydrochloric acid. Thereafter, the reaction mixture is stirred for 2 hours at this temperature, made weakly alkaline with a sodium hydroxide solution (pH 8–9), and the thus-formed 2,6 - dichloro-4-[5-aminothienyl-(2)]-pyridine-3,5-dicarbonitrile is extracted with chloroform. For purification purposes, the product is chromatographed on silica gel/chloroform.

*Analysis* for $C_{11}H_4Cl'N_4S$.—Calc. (percent): C, 44.76; H, 1.37; Cl, 24.03. Found (percent): C, 45.10; H, 1.00; Cl, 25.80.

Analogously, 2,6 - dichloro - 4 - [5-aminofuryl-(2)]-pyridine-3,5-dicarbonitrile and 2,6 - dichloro-4-[5-aminopyrrolyl-(2)]-pyridine - 3,5-dicarbonitrile are obtained.

Example E 2.8 g. of 2,6 - dichloro-4-[5-aminofuryl-(2)]-pyridine-3,5-dicarbonitrile in 20 ml. of dioxane is boiled under reflux with 10 ml. of acetyl chloride for 30 minutes. After distilling off the unreacted acetyl chloride under reduced pressure, 100 ml. of water is added and the thus-precipitated 2,6-dichloro-4-[5 - acetyl-aminofuryl - (2)]-pyridine-3,5-dicarbonitrile is vacuum-filtered and washed with a small amount of ether.

Example F 13.2 g. of 2,6-dichloro-4-[furyl-(2)]-pyridine-3,5-dicarbonitrile is added to a suspension of 8.3 g. of the pyridine 2SO₃ addition product in 50 ml. of dichloroethane, and the reaction mixture is agitated for 12 hours at room temperature. The mixture is then poured into 200 ml. of water, separated from the organic phase and the aqueous phase is neutralized with barium carbonate. From the thus-precipitated barium salt of 2,6-dichloro-4-[5-sulfofuryl-(2)]-pyridine-3,5-dicarbonitrile, the free sulfonic acid is liberated with a stoichiometric amount of sulfuric acid in methanol.

Analogously, 2,6 - dichloro - 4-[5-sulfopyrrolyl-(2)]-pyridine - 3,5 - dicarbonitrile and 2,6-dichloro-4-[5-sulfothienyl-(2)]-pyridine-3,5-dicarbonitrile are produced by substituting the corresponding pyrrolyl and thienyl-substituted, respectively, 2,6 - dichloro - pyridine - 3,5 - carbonitrile.

Example G 4.5 g. of acetic anhydride is added at 0° C. under agitation to a suspension of 6.7 g. of AlCl₃ in 60 ml. of 1,2-dichloroethane. Thereafter, under stirring and cooling, a solution of 12 g. of 2,6-dichloro-4-[thienyl-(2)]-pyridine-3,5-dicarbonitrile in 50 ml. of 1,2-dichloroethane is added dropwise over a period of 30 minutes.

The reaction mixture is stirred for another 2 hours at 0° C. and is then poured into 1 liter of ice water acidified with hydrochloric acid. The organic phase is separated, and the aqueous phase is shaken out twice with 50 ml. portions of 1,2-dichloroethane. The combined organic phases are washed neutral with aqueous solution of NaHCO₃, dried over sodium sulfate, and evaporated. The residual 2,6-dichloro-4-[5-acetylthienyl-(2)]pyridine-3,5-dicarbonitrile is chromatographed on silica gel/chloroform for purposes of purification.

Analogously, 2,6 - dichloro - 4 - [5 - acetylfuryl-(2)]-pyridine - 3,5 - dicarbonitrile and 2,6-dichloro-4-[5-acetylpyrrolyl-(2)]-pyridine-3,5-dicarbonitrile are obtained by substituting the corresponding furyl and pyrrolyl substituted, respectively 2,6-dichloro-pyridine-3,5-dicarbonitrile as starting material.

FORMULATION EXAMPLES

EXAMPLE 1.—Sprayable powder

| | Percent |
|---|---|
| 2,6 - dichloro - 4-[furyl-(2)]-pyridine-3,5-dicarbonitrile | 50 |
| Sodium dialkyl naphthalene sulfonate | 0.5 |
| Sulfite waste liquor powder | 12 |
| Kaolin | 37.5 |

EXAMPLE 2.—Sprayable powder

| | Percent |
|---|---|
| 2,6 - dichloro - 4 - [furyl - (2)] - pyridine - 3,5 - dicarbonitrile | 80 |
| Oleic acid-N-methyltaurine | 8 |
| Bentonite | 12 |

EXAMPLE 3.—Sprayable powder

| | Percent |
|---|---|
| 2,6 - dichloro - 4 - [furyl - (2)] - pyridine - 3,5 - dicarbonitrile | 30 |
| N-trichloromethylthio-tetrahydrophthalimide | 50 |
| Sodium alkylbenzene sulfonate | 1 |
| Sulfite waste liquor power | 3 |
| Siliceous chalk (naturally occurring mixture of fine quartz and kaolin) | 16 |

EXAMPLE 4.—Dispersion

| | Percent |
|---|---|
| 2,6 - dichloro - 4 - [furyl - (2)] - pyridine - 3,5 - dicarbonitrile | 20 |
| 1,4-dithia-anthraquinone-2,3-dicarbonitrile | 20 |
| Carboxymethylcellulose | 1 |
| Alkylphenol polyglycol ether | 2 |
| Bentonite | 1 |
| Water | 56 |

EXAMPLE 5.—Dispersion

| | Percent |
|---|---|
| 2,6 - dichloro - 4 - [furyl - (2)] - pyridine - 3,5 - dicarbonitrile | 20 |
| 2,6-dichloro-4-phenylpyridine-3,5-dicarbonitrile | 20 |
| Carboxymethylcellulose | 1 |
| Alkylphenol polyglycol ether | 2 |
| Bentonite | 1 |
| Water | 56 |

EXAMPLE 6.—Dusting agent

| | Percent |
|---|---|
| 2,6 - dichloro - 4 - [furyl - (2)] - pyridine - 3,5 - dicarbonitrile | 10 |
| Ground sulfur | 25 |
| Talc | 65 |

EXAMPLE 7

Analogously to Example 1, 50% sprayable powders are formulated containing, as the effective component, one or more of the following compounds, individually or as a mixture:

2,6-dichloro-4-[pyrrolyl-(2)]-pyridine-3,5-dicarbonitrile;
2,6-dichloro-4-[thienyl-(2)]-pyridine-3,5-dicarbonitrile;
2,6-dichloro-4-[5-chlorofuryl-(2)]-pyridine-3,5-dicarbonitrile;
2,6-dichloro-4-[5-sulfothienyl-(2)]-pyridine-3,5-dicarbonitrile;
2,6-dichloro-4-[5-acetylpyrrolyl-(2)]-pyridine-3,5-dicarbonitrile;
2,6-dichloro-4-[5-bromopyrrolyl-(2)]-pyridine-3,5-dicarbonitrile; and
2,6-dichloro-4-[5-aminofuryl-(2)]-pyridine-3,5-dicarbonitrile.

EXAMPLE 8

Analogously to Example 3, 80% sprayable powders are formulated containing, in addition to 50% of N-trichloro-methylthio-tetrahydrophthalimide, 30% of the following compounds, individually or as a mixture:

2,6-dichloro-4-[5-nitrofuryl-(2)]-pyridine-3,5-dicarbonitrile;
2,6-dichloro-4-[5-benzoylfuryl-(2)]-pyridine-3,5-dicarbonitrile;
2,6-dichloro-4-[5-diethylaminothienyl-(2)]-pyridine-3,5-dicarbonitrile;
2,6-dichloro-4-[5-chlorothienyl-(2)]-pyridine-3,5-dicarbonitrile;
2,6-dichloro-4-[5-sulfopyrrolyl-(2)]-pyridine-3,5-dicarbonitrile;
2,6-dichloro-4-[5-aminofuryl-(2)]-pyridine-3,5-dicarbonitrile; and
2,6-dichloro-4-[5-acetylaminofuryl-(2)]-pyridine-3,5-dicarbonitrile.

EXAMPLE 9

Analogously to Example 4, dispersion concentrates are prepared containing, in addition to 20% of 1,4-dithio-anthraquinone-2,3-dicarbonitrile, 20% of the following compounds individually or optionally as a mixture with other compounds of Formula I:

2,6-dichloro-4-[5-bromofuryl-(2)]-pyridine-3,5-dicarbonitrile;
2,6-dichloro-4-[5-nitrothienyl-(2)]-pyridine-3,5-dicarbonitrile;
2,6-dichloro-4-[5-bromothienyl-(2)]-pyridine-3,5-dicarbonitrile;
2,6-dichloro-4-[5-acetylfuryl-(2)]-pyridine-3,5-dicarbonitrile; and
2,6-dichloro-4-[5-iodofuryl-(2)]-pyridine-3,5-dicarbonitrile.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A compound of the formula

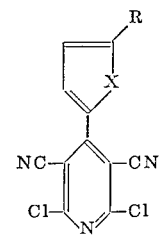

wherein X is a member of the group consisting of O, and NH, and R is a member of the group consisting of H, halogen, $NO_2$, $SO_3H$, $NR_1R_2$ and acyl is represented by alkanoyl having up to 8 carbon atoms and benzoyl, wherein $R_1$ and $R_2$ each are members of the group consisting of H, alkyl and acyl is represented by alkanoyl having up to 8 carbon atoms and benzoyl.

2. A compound of claim 1 wherein X is O.
3. A compound of claim 1 wherein R is H.
4. A compound of claim 1 selected from the group consisting of 2,6-dichloro-4-[pyrrolyl-(2)]-pyridine-3,5-dicarbonitrile;
2,6-dichloro-4-[5-chloropyrrolyl-(2)]-pyridine-3,5-dicarbonitrile;
2,6-dichloro-4-[5-bromopyrrolyl-(2)]-pyridine-3,5-dicarbonitrile;
2,6-dichloro-4-[5-nitropyrrolyl-(2)]-pyridine-3,5-dicarbonitrile;
2,6-dichloro-4-[5-sulfonylpyrrolyl-(2)]-pyridine-3,5-dicarbonitrile; and
2,6-dichloro-4-[5-acetylpyrrolyl-(2)]-pyridine-3,5-carbonitrile.

5. 2,6-dichloro-4-[furyl-(2)]-pyridine - 3,5 - dicarbonitrile, a compound of claim 2.
6. 2,6-dichloro - 4 - [5-chlorofuryl-(2)]-pyridine-3,5-dicarbonitrile, a compound of claim 2.
7. 2,6-dichloro - 4 - [5-bromofuryl-(2)]-pyridine-3,5-dicarbonitrile, a compound of claim 2.
8. 2,6-dichloro-4-[5-nitrofuryl-(2)]-pyridine - 3,5 - dicarbonitrile, a compound of claim 2.
9. 2,6-dichloro - 4 - [5-sulfonylfuryl-(2)]-pyridine-3,5-dicarbonitrile, a compound of claim 2.
10. 2,6-dichloro - 4 - [5-aminofuryl-(2)]-pyridine-3,5-dicarbonitrile, a compound of claim 2.
11. 2,6 - dichloro-4-[5-acetylaminofuryl-(2)]-pyridine-3,5-dicarbonitrile, a compound of claim 2.
12. 2,6-dichloro - 4 - [5-acetylfuryl-(2)]-pyridine-3,5-dicarbonitrile, a compound of claim 2.

References Cited

UNITED STATES PATENTS 3,284,293 11/1966 Mohr et al. _____ 260—294.9
3,468,895 9/1969 Mohr et al. _____ 260—294.9

ALAN L. ROTMAN, Primary Examiner

U.S. Cl. X.R.

260—294.8 D; 294.9; 424—263